United States Patent [19]
Martlew et al.

[11] Patent Number: 5,862,169
[45] Date of Patent: Jan. 19, 1999

[54] FLOAT GLASS PRODUCTION

[75] Inventors: David Martlew, St. Helens; Robert Emmett Trevelyan; Graham Unwin, both of Wigan; Peter James Whitfield, St. Helens, all of United Kingdom

[73] Assignee: Pilkington PLC, St. Helens, United Kingdom

[21] Appl. No.: 904,554

[22] Filed: Aug. 4, 1997

[30] Foreign Application Priority Data

Aug. 3, 1996 [GB] United Kingdom ............... 9616364

[51] Int. Cl.$^6$ .................................................. C03B 5/027
[52] U.S. Cl. .................................................. 373/32; 373/27
[58] Field of Search ..................... 373/27, 29, 31–35; 65/29.1, 29.17, 66, 121, 134.3, 134.5, 347, 335

[56] References Cited

U.S. PATENT DOCUMENTS

| | | | |
|---|---|---|---|
| 1,593,054 | 7/1926 | Arbeit | 373/32 |
| 4,118,215 | 10/1978 | Brax | 65/134 |
| 4,789,990 | 12/1988 | Peiper | 373/32 |
| 4,831,633 | 5/1989 | Argent | 373/32 |
| 5,588,978 | 12/1996 | Argent et al. | 65/29.1 |

*Primary Examiner*—Tu Ba Hoang
*Attorney, Agent, or Firm*—Howrey & Simon

[57] ABSTRACT

A float glass production facility comprising a furnace including a melter, a refiner and a working end, the working end having two or more exits, each of which supplies a separate canal and float glass forming chamber, the working end being operable so that the glass flow through each of the two or more exits is independent of the flow of glass through the other exits.

20 Claims, 4 Drawing Sheets

FLOAT GLASS PRODUCTION

BACKGROUND OF THE INVENTION

1. Field of the Invention

This invention relates to the production of float glass.

2. Related Arts

A conventional float glass production line comprises a glass melting furnace, otherwise known as a tank, in which batch material is melted and the resultant molten glass is refined and conditioned, a float glass forming chamber, otherwise known as a bath, in which molten glass received from the furnace is formed into a float glass ribbon, and an annealing lehr in which the ribbon cools during its travel from the bath to a wareroom in which the glass is cut into plates and stacked. The capacity, i.e. the maximum throughput, of such a line is determined by the maximum throughput of the lowest capacity part of the line, and the line may be required to operate at different throughputs and to make different products, e.g. different glass thicknesses (substances), at different times. This can limit the efficient use of the furnace which may frequently have to operate below capacity and of the float forming chamber which may have to be equipped to produce a variety of products.

There have been prior proposals for feeding a plurality of flat glass forming chambers from a single glass melting furnace—see for example U.S. Pat. No. 3,932,165. However, such production arrangements run the risk of impaired glass quality, both with regard to discrete faults such as stones or bubble and with regard to the overall optical quality, which with float glass generally has to be of a standard considerably higher than that for other forms of glass including other forms of flat glass.

SUMMARY OF THE INVENTION

According to the present invention there is provided a float glass production facility including a melting furnace having a melting zone in which batch material is melted to form molten glass, a refining zone in which the molten glass is refined to a standard suitable for float glass manufacture and a working end from which the refined glass is fed for ribbon float glass manufacture and a working end from which the refined glass is fed for ribbon forming, there being a first canal connecting a first exit from the working end to a first float glass forming chamber and a second canal connecting a second exit from the working end to a second float glass forming chamber, in which the working end is operable so that flow of glass through one of the exits is independent of the flow of glass through the other exit, and the second canal has a depth adjacent the second exit such that the flow of glass along the canal is in a direction away from the exit and return flow through the exit back into the working end is precluded and has a length greater than its width sufficient to permit thermal conditioning and homogenization of glass flowing along the second canal, there being associated with the second canal means for thermally conditioning and means for homogenizing glass flowing along it, and a shut-off device to shut off flow of glass along the second canal from the second exit in the working end. It will be appreciated that such a facility can, in effect, provide two float glass production lines fed from a single melting furnace which can permit more efficient use of the furnace and the float forming chambers and can enable different products to be produced on the respective different lines at the same time.

Preferably the second canal constrains glass flow to unidirectional flow throughout its length so that there is no return flow in the second canal. This can be achieved by an appropriate depth for the second canal but it may have at least one gradual change of cross-section, i.e. of depth and/or width. The second canal may have a bend which can conveniently permit the second line to run parallel to the first.

The homogenizing means associated with the second canal preferably comprise stirrers which may, in particular, be provided in the second canal near its downstream end.

The first and second exits in the working end are preferably sufficiently spaced to achieve independence of respective glass streams flowing through them. However, stirrers may be provided in the working end close to the first exit to homogenise molten glass flowing towards the first exit thereby assisting to ensure such independence. The first exit may be in an end wall and the second exit in a side wall of the working end, the second exit preferably being located at least two thirds of the length of the side wall from the end wall. Preferably the second canal joins the second exit substantially at right angles to the working end wall containing the second exit.

All the previously mentioned stirrers are preferably paddle stirrers.

The thermal conditioning means associated with the second canal may comprise overhead heaters or may comprise electrodes to effect Joule heating or may comprise a combination of these.

The working end may have one or more further exits additional to the first and second exits for feeding molten glass to one or more further float glass forming chambers, there being a respective further canal having similar features to the second canal between each such further exit and the respective float glass forming chamber.

The invention also provides a method of producing float glass including melting batch material to form molten glass in a melting zone of a single melting furnace, refining the molten glass in the single melting furnace to a standard suitable for float glass manufacture, feeding a first stream of refined molten glass from a working end of the single melting furnace and forming that glass into a first float glass ribbon, feeding a second stream of refined molten glass independently of the first stream from the working end of the single melting furnace and thermally conditioning and homogenizing the molten glass in the second stream and then forming that glass into a second float glass ribbon.

The method may include stirring molten glass in the working end of the single melting furnace as it passes into the first stream and may include stirring molten glass in the second stream just prior to its delivery to a chamber for formation into the second float glass ribbon.

Surprisingly it has been found that, with a facility or method in accordance with the invention, a number of ribbons each of good quality float glass can be formed from molten glass fed in respective streams from the working end of a single melting furnace, even with different throughputs for the respective streams and with asymmetrical arrangements.

BRIEF DESCRIPTION OF THE DRAWINGS

In order that the invention may be better understood embodiments of it will now be described, by way of example, with reference to the accompanying drawings, in which.

DETAILED DESCRIPTION OF THE INVENTION

Figure 1:
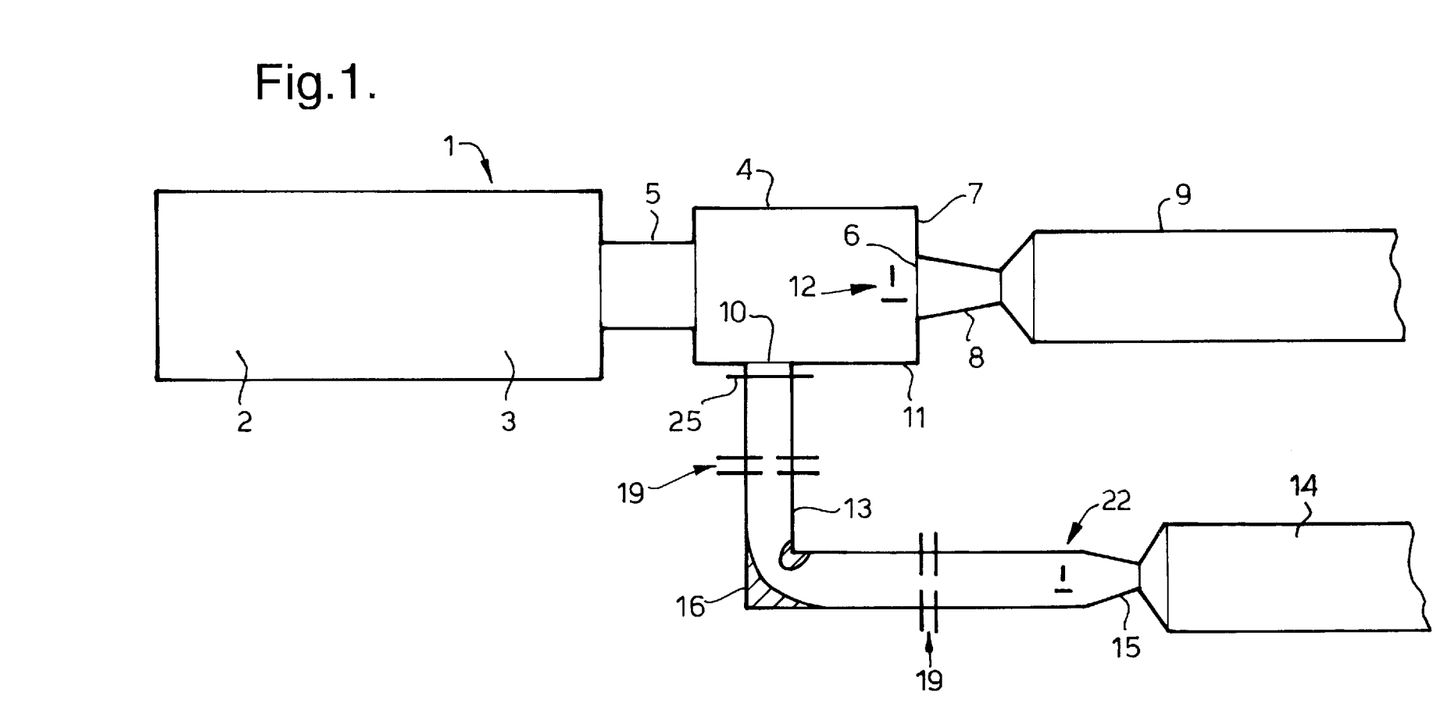
FIG. 1 is a schematic plan view of part of a float glass production facility.

FIG. 1 shows a glass melting furnace 1 which comprises a melting zone 2, a refining zone 3 and a working end 4. Batch material is fed into the melting zone 2 in well known manner and is melted there to form molten glass which is then refined, i.e. bubbles are removed, in the refining zone 3. The molten glass then passes to the working end 4 in which conditioning of the glass takes place. The furnace shown in FIG. 1 is of a form having a waist 5 between the refining zone 3 and the working end 4. Stirrers and water cooled pipes may be used in or adjacent the waist 5 to homogenize the glass passing through it, for example in a manner as described in British Patent Specification 1503145. As will be well understood by those skilled in the art, there may not be precise fixed boundaries between the melting, refining and conditioning zones of the glass melting furnace. It will further be understood that the particular form of furnace shown in FIG. 1 is given by way of illustration and example only and that any other form of glass melting furnace capable of producing molten glass of a quality and refined to a standard suitable for the manufacture of float glass could be employed.

The working end 4, which is shown as rectangular in form, has a first exit 6 in its end wall 7 through which a first stream of molten glass flows into a first canal 8, shown as tapered, by which it is delivered to a first float glass forming chamber 9. A tweel (not shown) is provided to control and, if necessary, halt the flow of glass being delivered from the canal 8. The glass so delivered is formed into a first float glass ribbon which is then drawn from the exit of the forming chamber through a lehr (not shown) to a cutting room in well known manner.

The installation as so far described with reference to FIG. 1 is a conventional float glass production line.

In accordance with the present invention the working end 4 of the melting furnace has a second exit 10 through which a second stream of molten glass can flow. This second exit 10 is located in a side wall 11 of the working end at a distance at least two thirds of the length of the side wall 11 from the end wall 7. In other words the second exit 10 is located in the first third of the length of the side wall 11 from the waist end of the working end but preferably not immediately adjacent the corner. The second exit 10 is therefore well spaced from the first exit 6 and more particularly the first and second exits are sufficiently spaced so that interaction between the first and second glass streams flowing respectively through them can be avoided and independence of the streams can be achieved. If desired the avoidance of such interaction can be assisted and such independence further assured by using stirrers 12 in the working end 4 close to the first exit 6 in a manner as described in British Patent Application No. 95/22123.0 which may permit a closer spacing of the first and second exits 6 and 10. In any event, the working end can be operated so that flow of glass through one exit does not affect and is independent of the flow of glass through the other.

A second canal 13 connects the second exit 10 to a second float glass forming chamber 14. This second canal 13 is a long canal relative to the first canal 8, i.e. it has a length greater than its width sufficient to permit thermal conditioning and homogenization of glass flowing along it as described later. The second canal 13 joins the second exit 10 substantially at right angles to the side wall 11 and has a depth adjacent the exit such that the flow of glass along the canal is in a direction away from the exit and return flow through the exit back into the working end is precluded. This ensures that the molten glass in the working end is not contaminated or adversely affected by back flow from the second canal 13.

Preferably the second canal 13 is effectively uniflow, i.e. it constrains glass flow to unidirectional downstream flow, throughout its length. If desired, however, it may have changes in depth but gradual changes in preference to step changes so as to ensure smooth flow and avoid creating pockets of slow-moving glass which can increase the risk of glass faults. Likewise the second canal may if desired have changes in width but again these are preferably gradual rather than step changes for the same reasons. Thus changes in cross-section of the second canal are best achieved by tapered transition sections. FIG. 1 shows such a tapered section 15, which reduces in both width and depth, near the downstream end of the second canal 13 where it delivers the molten glass to the second float glass forming chamber 14. A tweel (not shown) is provided to control, and if necessary halt, the flow of glass into the forming chamber. Since the second canal 13 is a long canal it can suffer from significant 'drawdown', ie. the level of the free glass surface drops along the canal due to frictional pressure losses. This can affect the head of glass effective behind the control tweel and the depth of the canal needs to be sufficient to ensure that tweel control can be maintained. The delivered glass is formed in the chamber 14 into a second float glass ribbon which is drawn from the chamber's exit through a lehr (not shown) to a cutting section in well known manner.

The second canal 13 has a right angle bend 16 which enables the second float glass forming chamber 14 to lie parallel to the first float glass forming chamber 9. The length of the first leg of the canal 13 between the working end 4 and the bend 16 is sufficient to leave enough room between the forming chambers 9 and 14 for their satisfactory operation, including for example start-up operations, insertion and withdrawal of devices such as top rolls, coolers, coating equipment, and the like. The length of the second leg of the canal 13 between the bend 16 and the forming chamber 14 is sufficient for a convenient forming chamber entrance location, for example approximately level with or slightly downstream of the entrance to the first forming chamber 9. This provides a convenient factory lay-out with the first and second lines (made up of respective forming chamber, lehr and cutting section) parallel. In practice, with appropriate conveyor arrangements, there may be some sharing of cutting and stacking facilities.

Figure 2:
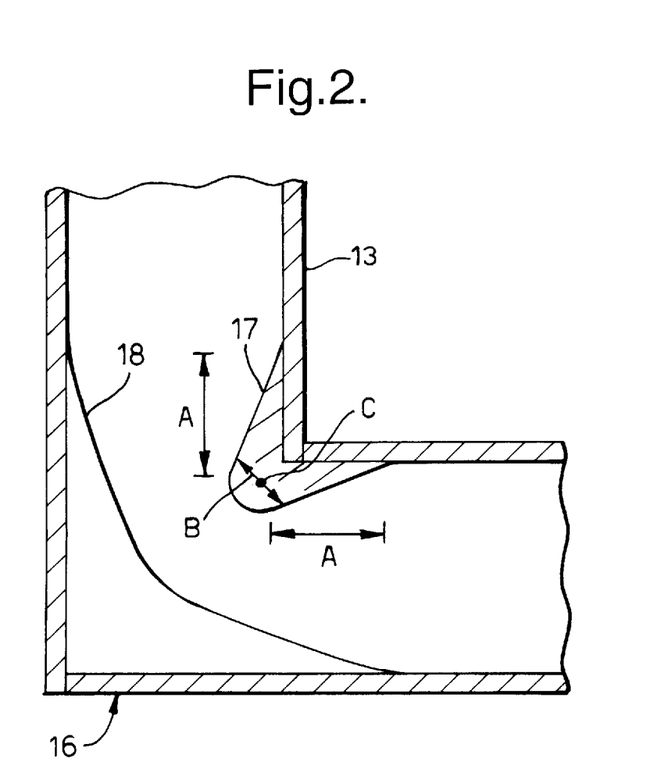
FIG. 2 is a schematic representation of a bend in a canal.

In order to minimize adverse effects arising from flow of glass round the bend 16 it is preferably of swan-neck form as used elsewhere in the glass industry. This form involves protrusions 17 and 18 providing a taper to about half width into the actual bend followed by a smooth expansion back to full width coming out of the bend as shown in FIG. 2. This achieves a more symmetrical glass flow about the centre-line of the canal as is well known in the art.

Figure 3:
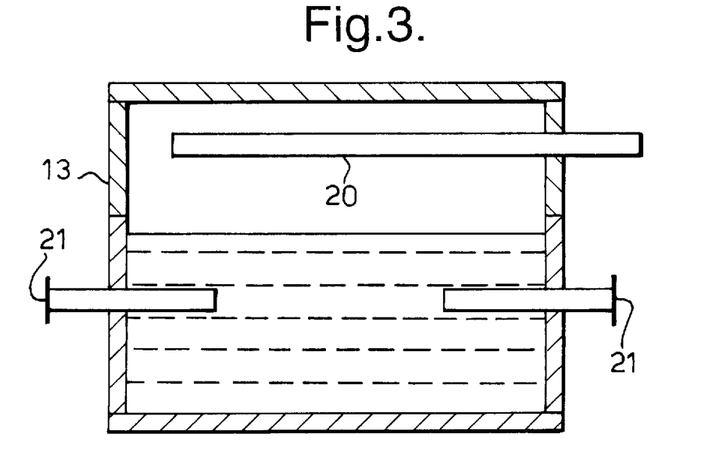
FIG. 3 is a schematic cross-section showing heating means in a canal.

Thermal conditioning means 19 are associated with the second canal 13 to condition the molten glass flowing along it. FIG. 1 indicates one such thermal conditioning means in each leg of the canal but it will be understood that they may be located anywhere as required along the canal length. FIG. 3 shows particular forms of thermal conditioning means comprising overhead radiant heaters 20, which may be gas or oil burners or electrical, and electrodes 21 immersed in the flowing glass to effect Joule heating. In practice the thermal conditioning means may comprise one or other or a combination of such types of heaters.

Homogenizing means 22 are also associated with the second canal 13 to homogenize the molten glass flowing along it. FIG. 1 shows such homogenising means 22 near the downstream end just before the tapered section 15 in the form of stirrers also shown in FIGS. 4 and 5. The stirrers 23 and 24 constitute a pair of paddle stirrers arranged to rotate in opposite directions 90° out of phase. The spacings between the respective stirrers and between the stirrers and the canal side walls are such as to achieve effective homogenization without hindering the throughput. The clearance between the stirrers and the canal floor should be small enough to avoid significant leakage but large enough to avoid mechanical contact or severely accelerated corrosion of the canal bottom. The paddles or blades of the stirrers should be wholly immersed in the glass so that only the shafts break the free glass surface, the blade tops being sufficiently below the glass surface to avoid bubble entrainment or excessive wave generation but sufficiently close to it to preclude leakage of unstirred glass above the blades. The stirrers are preferably not water-cooled for fear of heavy chilling effects leading to glass devitrification, but may be made of resistant refractory ceramics, refractory shapes coated with noble metal, or refractory metal alloys.

Although FIG. 1 indicates stirrers only near the downstream end of the second canal 13, they may be located at other positions along the canal as required.

A shut-off device 25, analagous to a tweel, is provided as indicated in FIG. 1 at the entrance to the second canal 13 to shut off flow of glass along the second canal from the second exit 10 in the working end 4. This device 25 is preferably located as close as feasible to the side wall 11 containing the exit 10 so as to minimize the amount of glass between the exit 10 and the device 25, and the device 25 is preferably water cooled to freeze the adjacent glass when it is in the shut-off position. The device 25 can be used to stop the flow of glass to the second canal 13 when, for whatever reason, the second float forming chamber is not operative.

The manner of operation of the facility will be largely apparent from the above. Glass batch is melted to form molten glass in the melting zone 2 of the single melting furnace 1 and the molten glass is refined in the refining zone 3. When both lines are in operation a first stream of refined molten glass is fed from the first exit 6 of the working end of the single melting furnace and formed into a first float glass ribbon in the first forming chamber 9 while a second independent stream of refined molten glass is fed from the second exit 10 of the working end of the single melting furnace. The molten glass in the second stream is thermally conditioned and homogenized as it travels along the second canal 13 and then formed into a second float glass ribbon in the second forming chamber 14. If desired the molten glass passing into the first stream can be stirred by the stirrers 12 in the working end just prior to its delivery to the first forming chamber 9. The molten glass in the second stream can be stirred at the downstream end of the long canal 13 just prior to its delivery to the second forming chamber 14.

The forming chambers 9 and 14 can be operated to make different products at the same time. For example one might have coating equipment to make a coated product while the other makes uncoated glass. They could produce different respective ribbon thicknesses (substance) and/or widths. Additives to the base glass could be injected into the second canal. Further, by suitable product mix adjustment the single melting furnace may operate at nearly constant throughput (load) permitting greater efficiency and cost advantages, optimized furnace design and enhanced basic glass quality. If it is required to shut-off the first line, this can be done by the tweel at the delivery to the first forming chamber 9. If it is required to shut-off the second line, this can be done by operation of the shut-off device 25 (thereby isolating virtually all the glass in the second canal 13 from the working end 4 which is preferable to shutting off by means of the tweel at the delivery to the second forming chamber 14).

It will be appreciated that a facility in accordance with the invention may be built as a new plant or may be formed by adding to an existing plant. Thus the embodiment shown in FIG. 1 could be arrived at by adding the second canal 13 and the second float forming chamber 14 to an existing plant comprising the melting furnace 1, the first canal 8 and the first float forming chamber 9. In this case stirrers 12 in the working end close to the first exit 6 may be highly desirable and if necessary the capacity of the existing melting furnace 1 may be increased by the application of boost heating so as to raise its output to satisfy both lines.

It will further be understood that the dimensions and operating parameters of the second canal will be chosen to meet the particular requirements of the plant. Such choice is within the capabilities of those skilled in the art, possibly with some trial and experiment, and the following information, based largely on model work, is given by way of illustration and example for guidance only.

The second canal should generally have a length greater than about four metres and would typically be much longer, for example about forty metres or even more. In the FIG. 1 embodiment, for example, the second canal 13 may have a first leg of about 22 metres to the bend 16 and a second leg also of about 22 metres from the bend 16 to its downstream end, giving a total length of about 44 metres. The glass conveying width of the second canal 13 may be about two metres narrowing to about one metre at its downstream end where it delivers the glass to the second forming chamber 14, the length of the tapering section 15 being about one metre. At the swan-neck bend 16 the glass conveying width also reduces to about one metre. The radii of curvature of the inner and outer protrusions 17 and 18 may be about 300 mm and 1300 mm respectively about the same centre C, the other dimensions of the inner protrusion 17 shown as A and B in FIG. 2 being about one metre and 600 mm respectively.

The depth of glass in the second canal 13 just upstream of the tapering section 15 may be about 500 mm reducing to about 300 mm downstream of the tapering section 15. As previously mentioned, the drawdown phenomenon means the glass depth will be greater at the upstream end of the canal 13 but preferably the head loss should not exceed 10% of the glass depth at the control tweel so that, with the present example, the glass depth at the upstream end of the canal 13 is about 530 mm. As also explained previously, this depth is such that the flow is unidirectional and return flow into the working end 4 through the second exit 10 is prevented, such uniflow also improving process stability.

Figure 4:
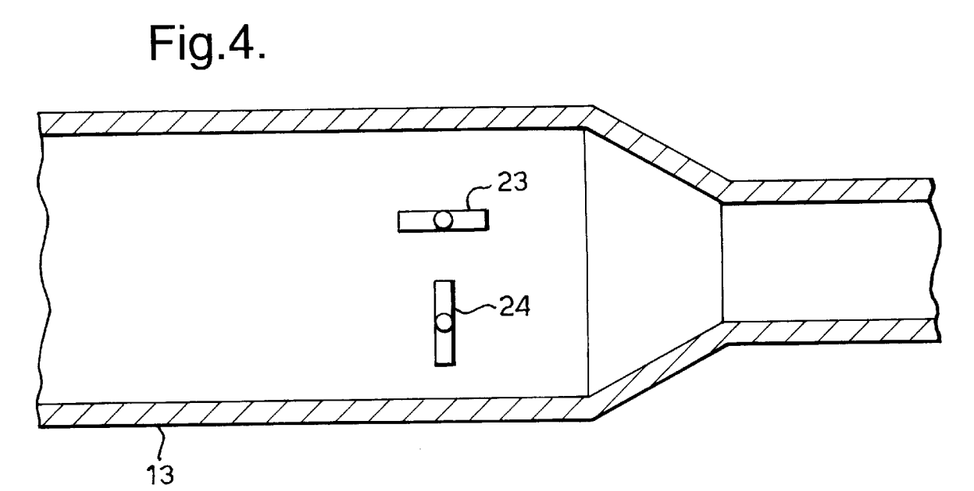
FIG. 4 is a schematic plan view showing stirrers in a canal.
Figure 5:
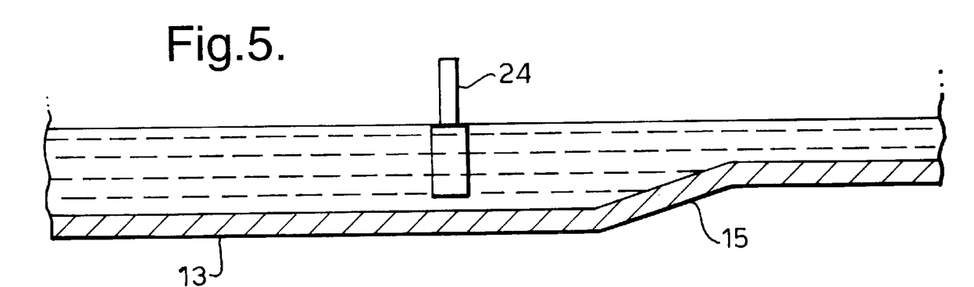
FIG. 5 is a schematic longitudinal section showing stirrers in a canal.

The paddle stirrers 23 and 24 near the downstream end of the second canal 13 are preferably rotated relatively slowly, e.g. at between 6 rpm and 20 rpm, to avoid introduction of bubble and to avoid 'blocking', i.e. when the net resistance to flow becomes excessive and the glass tends to flow over or under the stirrers rather than between them, but fast enough to ensure full homogenization. The blade width for each stirrer of a pair as shown in FIG. 4 is preferably between about 20% and 25% of the canal width, e.g. about 450 mm, the stirrers being mounted symmetrically about the canal centre line with a spacing between stirrer shaft centres of between about 35% and 40% of the canal width, e.g. about 760 mm. The nearest the blade edges come to the canal side walls in operation is preferably between about 16% and 23% of the canal width, e.g. about 395 mm. The clearance between the bottom of the stirrer blades and the canal floor may be between about 5% and 20% of the glass depth, e.g. about 60 mm. The canal floor may be constructed from corrosion-resistant refractories or have noble metal protection to permit a small clearance without introducing refractory corrosion faults which would severely impair good quality. The stirrer shafts may be located about 1200 mm upstream of the upstream end of the tapered section 15, this being in practical terms just before delivery of the molten glass to the forming chamber 14.

The second canal 13 is designed and operated to avoid the introduction into the second molten glass stream of discrete faults which might otherwise arise for example from devitrification, stagnant or semi-stagnant glass, contamination with products of refractory corrosion, or events occurring in the joints between refractory glass contact blocks. Nevertheless, the depth of glass in the canal is such as to achieve uniflow operation and to prevent flow of glass back into the working end of the melting furnace from which such faults might be transmitted into the first stream.

The thermal conditioning means 19 serve to ensure that the required temperature conditions are maintained in the glass flowing along the second canal 13, including a desired surface temperature and acceptable side-to-side or side-to-centre and top-to-bottom temperature differences. Temperature control may also be assisted by judicious use of insulation, particularly around the below glass level structure of the canal bottom Glass entering the second canal 13 through the second exit 10 may, for a conventional float glass composition example, be at a temperature between about 1160° C. and 1190° C. It may be maintained in the first part of the canal at a surface temperature of about 1180° C. which may reduce to about 1170° C. at the bend 16. Between the bend 16 and the downstream end of the canal the glass may gradually cool in a controlled manner to a surface glass temperature of about 1100° C. at the delivery control tweel to the forming chamber 14. The side-to-side temperature differences which may be about 13° C. at entry to the canal 13 may reduce to a side-to-centre difference of about 8° C. or less and the top-to-bottom temperature difference may be about 15° C.

The throughput (load) of the glass melting furnace 1 may for example be about 7000 tonnes per week (tpw) with the first float line incorporating the first forming chamber 9 operating at about 4000 tpw and the second float line incorporating the second forming chamber 14 operating at about 3000 tpw.

It will yet further be appreciated that more than two lines could be taken off a single glass melting furnace, the working end of that furnace being provided with the required number of exits and being operable so that flow of glass through any one exit does not affect the flow of glass through any of the other exits whereby independent glass streams can be achieved, and there being respective canals having similar features to the described second canal connecting the additional exits to respective float glass forming chambers.

Figure 6:
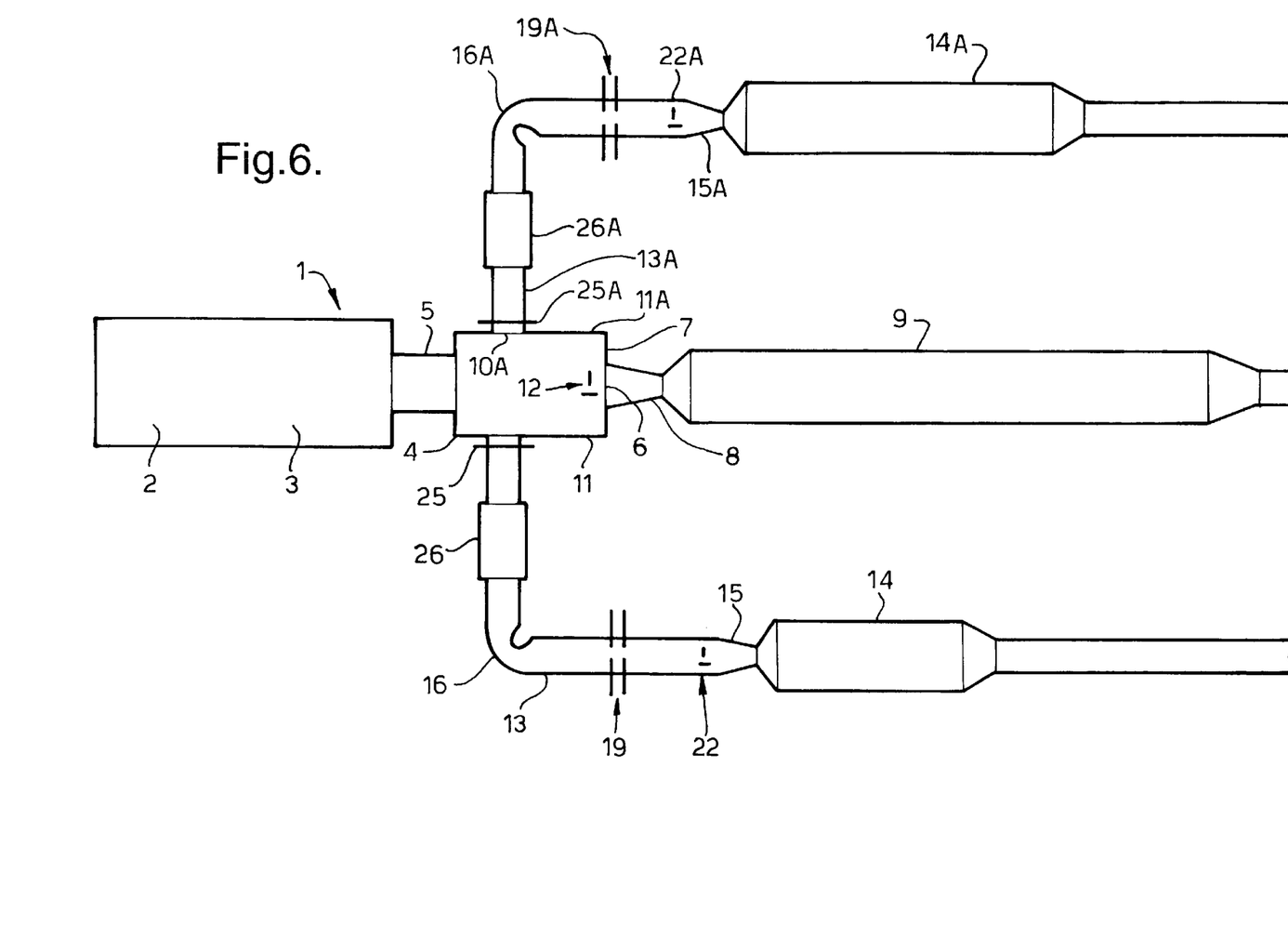
FIG. 6 is a schematic plan view of part of another float glass production facility.

FIG. 6 shows a facility having three lines. The arrangement of the first and second lines is essentially the same as in FIG. 1 and the same reference numerals are used to indicate the same parts. The third line is basically similar to the second line and is indicated by the same reference numerals as the second line but with the suffix A. Thus the third line is fed from a third exit 10A in the side wall 11A of the working end 4 opposite the side wall 11. A long third canal 13A having a swan-neck bend 16A and having associated thermal conditioning means 19A (shown after the bend only) and homogenizing means 22A near its downstream end which has a tapered section 15A, connects the third exit 10A to a third float glass forming chamber 14A. A shut-off device 25A in the third canal 13A adjacent the third exit 10A can be operated to shut-off flow of glass to that canal. When that device is open the refined molten glass flows as a third stream along the uniflow canal 13A to the forming chamber 14A in which it is formed into a third float glass ribbon. The separation of the respective exits 6, 10 and 10A in the working end and the use of stirrers 12 adjacent the first exit 6 avoids interaction between the glass streams flowing through the respective exits and ensures their independence.

FIG. 6 also shows modification or addition cells 26 and 26A located in the upstream legs of the long second and third canals 13 and 13A respectively. These cells can be operated to modify the molten glass flowing through the canal, for example by injecting additive material to alter its color or composition. With such cells the float glasses produced on the second and third lines can have different properties from that produced on the first line, which uses the unmodified standard base glass from the working end 4, and from each other. The facility can therefore simultaneously manufacture three float ribbons not only of different thicknesses and/or widths but also of different compositions or properties. If desired one or more of the float forming chambers may be provided with coating facilities to coat the float ribbon passing through. The glass melting furnace 1 may, for example, operate at about 12000 tpw with the first float line operating at about 8000 tpw, the second float line at about 1000 tpw, and the third float line at about 3000 tpw.

In the embodiments of FIGS. 1 and 6 the working end 4 of the glass melting furnace is of conventional rectangular form with exits provided in the end wall and side wall(s) the side wall length being, for example, of the order of 15 metres. It will be understood that if more than three lines are to be taken off the single melting furnace, then the working end may need to be of a different geometry, for example of polygonal or semicircular form, so as to permit the respective canals to join up to it and maintain independence of the glass streams flowing into them.

The embodiments of FIGS. 1 and 6 have parallel lines which is normally convenient for a factory lay-out. It will be understood, however, that if particular circumstances require or can tolerate lines in other angular relationships, e.g. at right angles to each other, this can be achieved by omitting the bend in the relevant canal or having the bend at a different angle.

Further variations from the embodiments specifically described which can be made without departing from the principles of the invention will be readily apparent to those skilled in the art.

For example, whereas a single pair of stirrers 23 and 24 is shown across the second canal 13, there could be two or more stirring pairs, or an uneven number of stirrers, across the canal width, the guideline dimensions given above being fractioned appropriately. Stirring may take place at a plurality of locations along the second canal 13, the locations being separated sufficiently to avoid adverse interaction. While a simple pair of stirrers at each location is preferred, there could be more as explained above. It will be understood that effective homogenization in the long canal is necessary, at least near the downstream end, to remove elliptical ream features which would prejudice the optical quality of the product and to remove side-to-side temperature variations which would prejudice uniformity of product thickness and it is surprising that this can be achieved by stirring in the canal to give good quality float glass in the second ribbon.

Similarly, more than two stirrers could be provided in the working end 4 near the first exit 6 although a single pair is preferred. It will be understood that while under some favorable design, glass composition and melting conditions these stirrers may be unnecessary, they can be helpful in protecting the first line from quality impairment which could otherwise arise due to changed conditioner flow patterns resulting from the secondary line(s), i.e. in rendering the working end operable to achieve independent glass streams so that flow of glass through one of the exits does not affect the flow of glass through the other exit(s).

It will be appreciated that a float glass production facility with plural lines running off a single melting furnace each capable of making good quality float glass has considerable benefits in enabling efficient operation of the melting furnace while producing a desired float glass product mix. One (main) line may be used to manufacture standard clear float glass products at popular widths and thicknesses, the melting furnace producing such clear float glass, while the other line or lines are used to produce less widely used products. For example one may make coloring float glass through the addition of coloring material in its respective canal thereby also enabling color adjustments to be rapidly made. A certain line, particularly the float forming chamber, may be specifically designed for a particular product output, such as thin glass or coated glass, and there may be provision for selectively modifying the products made on a particular line at different times to address short-run specialist markets.

We claim:

1. A float glass production facility comprising a melting furnace, said furnace including a melting zone in which batch material is melted to form molten glass; a refining zone in which said molten glass is refined to a standard suitable for float glass manufacture; a working end conditioning the refined molten glass, said working end defining first and second exit means; first canal means in communication with said first exit means and a first float glass forming chamber receiving said glass flowing along said first canal means; second canal means in communication with said second exit means and a second float glass forming chamber receiving said glass flowing along said second canal means; wherein said working end is operable so as to cause the flow of glass through one of said first and said second exit means to be independent of the flow of glass through the other of said first and said second exit means, and said second canal means having a depth dimension adjacent said second exit means such that the flow of glass along said second canal means is in a direction away from said second exit means and return flow through said second exit means into said working end is precluded, said second canal means also having a length dimension and a width dimension wherein said length dimension is greater than said width dimension such that thermal conditioning and homogenization of glass flowing along said second canal means occurs, said facility further including supplemental thermal conditioning means associated with said second canal means, supplemental homogenization means associated with said second canal means and shut-off means to shut off the flow of glass along said second canal means from said second exit means in said working end.

2. A facility as recited in claim 1 in which said second canal means constrains said glass to unidirectional flow throughout the length of said second canal means.

3. A facility as recited in claim 1 in which said second canal means defines at least one gradual change of cross section.

4. A facility as recited in claim 1 wherein said second canal means includes a bend portion.

5. A facility as recited in claim 1 wherein said supplemental homogenization means associated with said second canal means comprise stirrers.

6. A facility as recited in claim 5 wherein said stirrers are disposed in said second canal means in a region adjacent said second forming chamber.

7. A facility as recited in claim 1 additionally including stirrers disposed in said working end adjacent said first exit means.

8. A facility as recited in claim 5 or 7 in which said stirrers are paddle stirrers.

9. A facility as recited in claim 1 in which said supplemental thermal conditioning means associated with said second canal means comprise overhead heaters.

10. A facility as recited in claim 1 or 9 wherein said supplemental thermal conditioning means associated with said second canal means comprise electrodes to effect Joule heating of the glass.

11. A facility as recited in claim 1 wherein said first and second exit means in said working end are spaced at a distance from one another to cause the flows of glass streams flowing through said first and second exit means to be independent of one another.

12. A facility as recited in claim 1 wherein said working end comprises an end wall and opposed side walls connected to said end wall, said end wall defining said first exit means and one of said side walls defining said second exit means.

13. A facility as recited in claim 12 wherein said one of said side walls defining said second exit means has a length dimension, said second exit means being defined in a region spaced from said end wall by a distance of about two-thirds of said length dimension.

14. A facility as recited in claim 12 wherein said second canal means and said one of said side walls defining said second exit means extend substantially at right angles to one another.

15. A facility as recited in claim 1 wherein said working end defines at least one further exit for feeding molten glass to at least one further float glass forming chamber, further canal means connecting each said at least one further exit to each said further forming chamber.

16. A method of producing float glass comprising the steps of melting batch material to form molten glass in a melting zone of a single melting furnace including a working end; refining said molten glass in said single melting furnace to a standard suitable for float glass manufacture, feeding a first stream of refined molten glass from said working end of said single melting furnace and forming said glass in said first stream into a first float glass ribbon, feeding a second stream of refined molten glass independently of said first stream from said working end of said single melting furnace, thermally conditioning and homogenizing said molten glass in said second stream and forming said glass into a second float glass ribbon.

17. A method as recited in claim 16 including the additional step of stirring said glass in said working end of said single melting furnace as it passes into said first stream.

18. A method as recited in claim 16 including the additional step of stirring said molten glass in said second stream immediately prior to its delivery to a chamber for formation into said second float glass ribbon.

19. A method as recited in claim 17 including the additional step of stirring said molten glass in said second stream immediately prior to its delivery to said chamber for formation into said second float glass ribbon.

20. A float glass production facility comprising a melting furnace, said furnace including a melting zone in which batch material is melted to form molten glass; a refining zone in which said molten glass is refined to a standard suitable for float glass manufacture; a working end conditioning said refined glass, said working end defining a first and a second exit; a first canal in communication with said first exit and a first float glass forming chamber receiving said glass flowing along said first canal; a second canal in communication with said second exit and a second float glass forming chamber receiving said glass flowing along said second canal; wherein said working end is operable so as to cause the flow of glass through one of said first and said second exit to be independent of the flow of glass through the other of said first and said second exit.

* * * * *